Oct. 25, 1960    R. F. SMITH    2,957,607
VENDING MACHINE AND CREAM DISPENSER THEREFOR
Filed Dec. 15, 1958    7 Sheets-Sheet 1

INVENTOR
ROYAL F. SMITH
by:
ATTY.

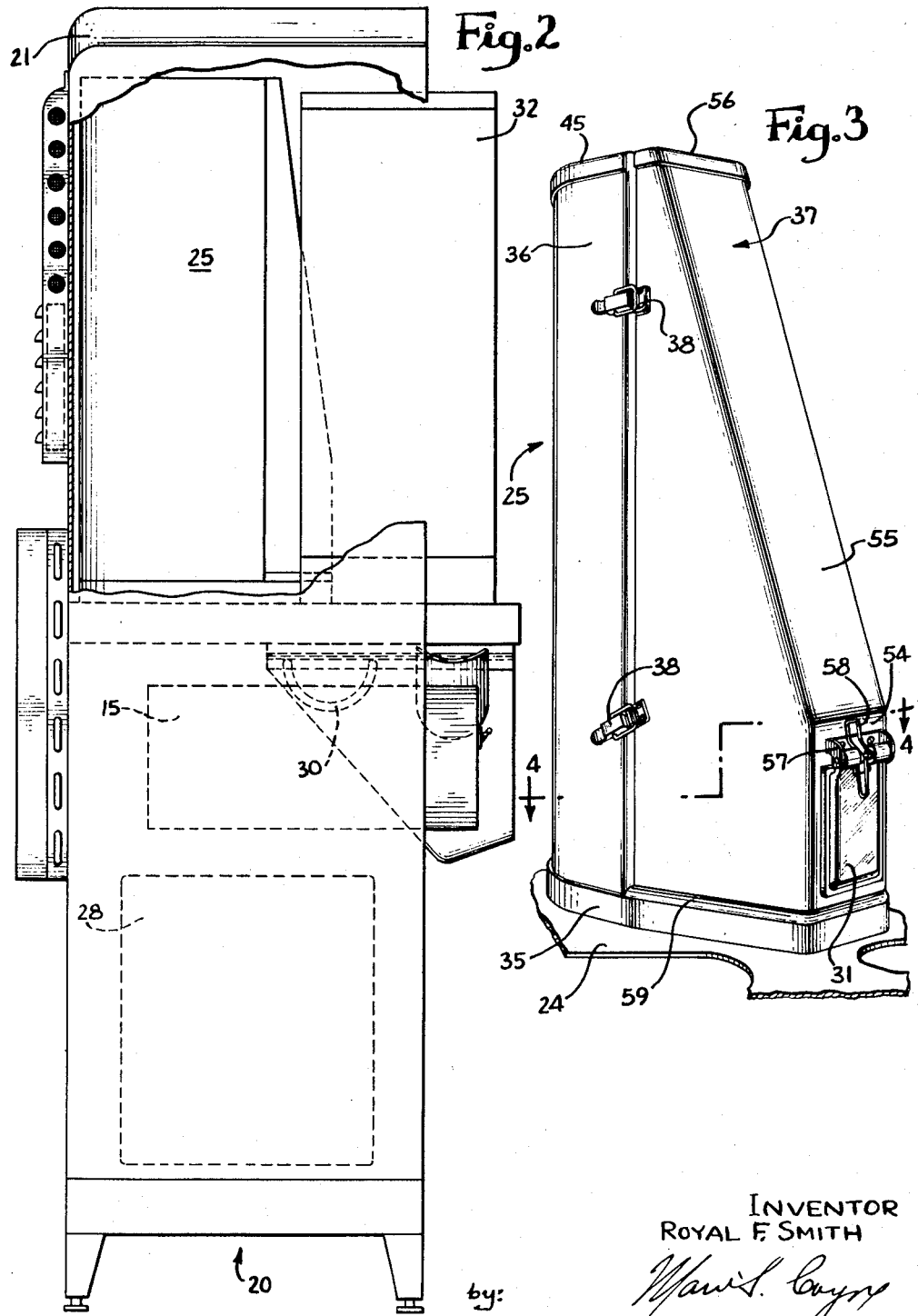

Oct. 25, 1960 R. F. SMITH 2,957,607
VENDING MACHINE AND CREAM DISPENSER THEREFOR
Filed Dec. 15, 1958 7 Sheets-Sheet 3
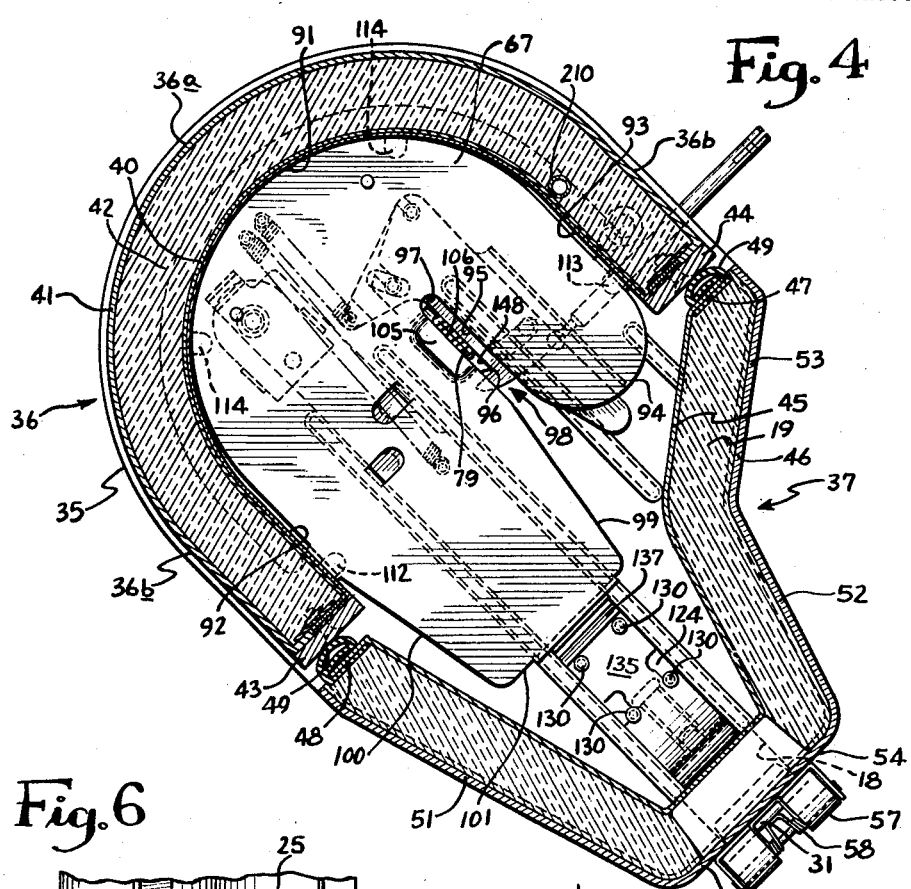
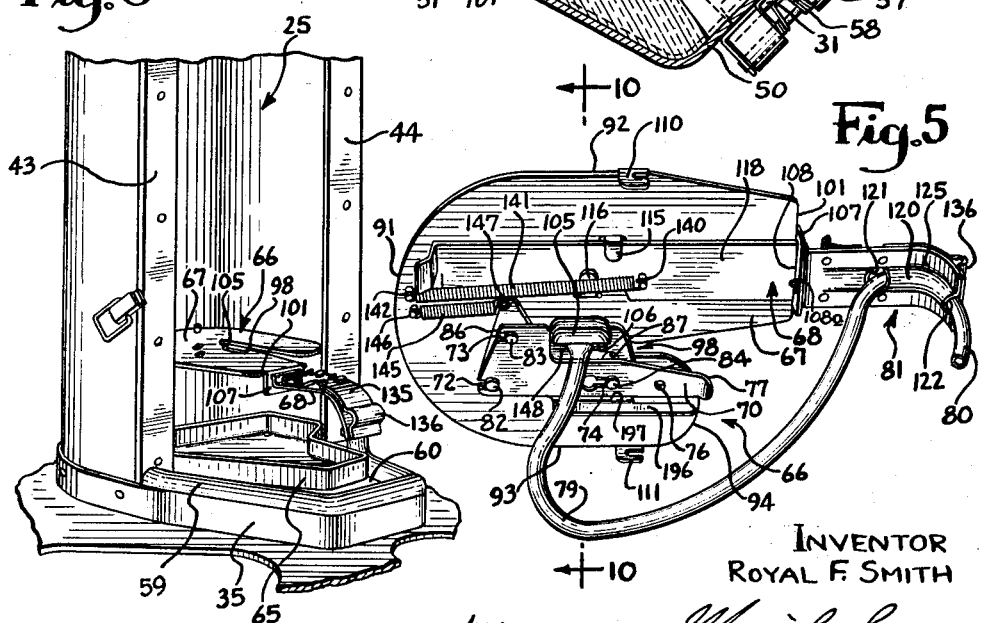
INVENTOR
ROYAL F. SMITH
by:
ATTY.

INVENTOR
ROYAL F. SMITH.
by: *[signature]*
ATTY.

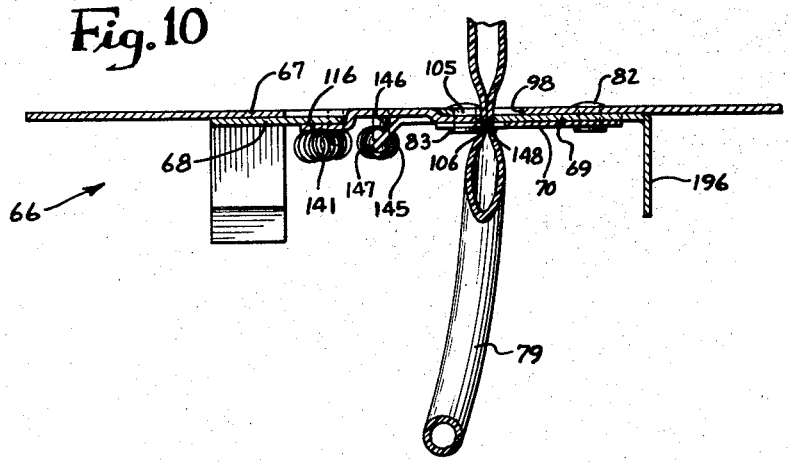
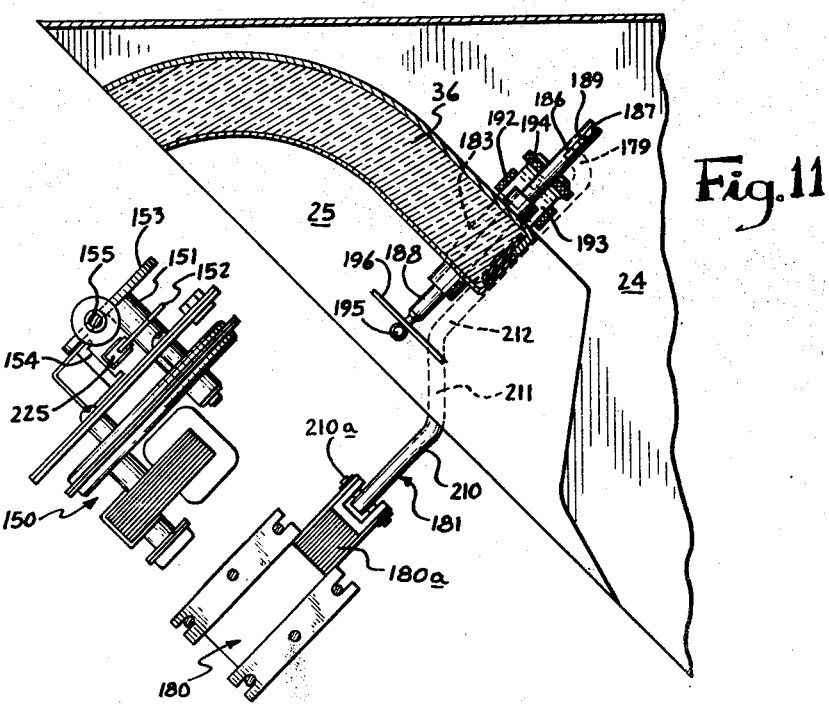

Oct. 25, 1960 R. F. SMITH 2,957,607
VENDING MACHINE AND CREAM DISPENSER THEREFOR
Filed Dec. 15, 1958 7 Sheets-Sheet 7

INVENTOR
ROYAL F. SMITH by: ATTY.

United States Patent Office 2,957,607
Patented Oct. 25, 1960

2,957,607

VENDING MACHINE AND CREAM DISPENSER THEREFOR

Royal F. Smith, Aurora, Ill.

Filed Dec. 15, 1958, Ser. No. 780,325

17 Claims. (Cl. 222—70)

This invention relates to a device for dispensing liquid ingredients, such as fresh cream, which require refrigeration to prevent spoilage, in which device the discharge end of the dispensing conduit is maintained in a sanitary condition. This invention further relates to an automatic machine for vending coffee, cocoa, tea, or the like, which machine comprises a dispensing device of the aforementioned type.

With the advent of automatic machines for vending coffee, cocoa, tea and the like, it was thought that fresh liquid cream could be provided therewith to be dispensed for use by customers who preferred it in their drinks. However, the utilization of fresh cream has heretofore presented an extremely serious contamination problem which has compelled the use of cream in the far less desirable form of dry powder.

As heretofore practiced in the prior art, dispensing devices for liquids requiring refrigeration to prevent spoilage included a refrigerated container for storing the liquid. In addition, there was connected to this refrigerated container a dispensing conduit terminating in a discharge end which was not maintained under refrigeration. The flow of liquid ingredient through this conduit discharge end to an awaiting receptacle was controlled by a shut-off device. Upon the cessation of liquid flow through the discharge end of the conduit, a residue of liquid film and droplets naturally remained there. Since the discharge end of the conduit was not refrigerated the liquid residue therein was exposed to ambient temperatures with the result that bacterial growth would occur. Continual repetition of the dispensing operation eventually resulted in a considerable buildup of bacterial growth in the conduit discharge end. This bacterial growth was unhealthy and made the dispensing conduit unsanitary. Furthermore, it contaminated the liquid ingredient being dispensed and imparted a foul taste to the vended mixture of which the liquid ingredient was a part.

The prior art, as heretofore practiced, sought to avoid this contamination problem by using powdered cream as a substitute for fresh cream. The powdered cream, obtained by dehydrating fresh cream, was stored in an ordinary canister and dispensed in its powdered form into a mixing receptacle or directly into a cup where it was mixed with hot fluid and other ingredients. By so using powdered cream, this partciular contamination problem was avoided. However, by using powdered cream rather than fresh cream, the beverage with which the customer was provided was less desirable from a taste standpoint. Nearly all customers who patronize vending machines would prefer the more pleasant tasting fresh cream to its powdered substitute.

On the other hand, the present invention uses the more desirable fresh cream and also solves the contamination problem. In this dispensing device no bacterial growth occurs in the conduit discharge end, which thus retains its original sanitary condition.

Maintaining the discharge end in its original sanitary condition is accomplished by keeping the dispensing conduit and the conduit discharge end in a refrigerated compartment whenever liquid ingredient is not being dispensed. When it becomes necessary to dispense the liquid ingredient (such as cream) a door on the refrigerated compartment is automatically opened and the conduit discharge end is automatically moved out of the refrigerated compartment for so long a time as the dispensing operation requires. When the dispensing operation is finished the discharge end is returned into the refrigerated compartment and the door is automatically closed. Keeping the conduit discharge end in the refrigerated compartment, except for that time required for the dispensing operation, protects the liquid residue from exposure to ambient temperatures and thus prevents the growth of bacteria.

Completely automatic operation is one of the important features of this dispensing device. It enables the incorporation of the dispensing device into an automatic machine for vending coffee and other beverages. This automatic vending machine, to which the present invention further relates, is actuatable to automatically dispense fresh cream along with hot water and other ingredients into a mixing receptacle or directly into a drinking cup in accordance with a predetermined vending cycle. That is, the automatic movement of the discharge end out of the refrigerated compartment to a position in which liquid ingredient is automatically dispensed into the receptacle is in timed relation to the dispensing therein of hot fluid and other ingredients. This vending machine thus provides a completely automatic vending operation while at the same time maintaining the conduit discharge end under refrigeration.

A further novel feature of the dispensing device to which the present invention relates is the flexible plastic hose which serves as the dispensing conduit. Utilization of a flexible hose facilitates the required movement of the conduit discharge end into and out of the refrigerated compartment and also enables the use of a pinch-type flow control means normally actuated to pinch the flexible tube and shut off the flow of fluid through the conduit. The pinch-type shut-off having no contact with the fluid cannot trap and retain fluid residues and thus provides a cleaner flow control means. In addition, this dispensing device features a member for mounting the conduit discharge end, which member is mounted for reciprocal movement, together with the conduit discharge end, into and out of the refrigerated compartment. A novel means for driving this member in its reciprocal movements is employed.

An additional feature is the means provided for deactuating the aforementioned pinch-type shut-off means in timed relation to the movement of the discharge end to the dispensing position.

Another novel feature of the dispensing device is the means utilized for automatically opening the door of the refrigerated compartment in timed relation to the outward movement of the conduit discharge end.

In addition, all parts have been constructed to enable assembly and dismantling thereof without the use of tools so as to facilitate ease of cleaning and for sanitation purposes.

The invention will now be more fully described, reference being had to the accompanying drawings in which:

Fig. 2 is a side elevational view of the vending machine with the upper part of the cabinet wall cut away.

Fig. 3 is a perspective view of a dispensing device for a liquid, such as cream, requiring refrigeration to prevent spoilage.

Fig. 4 is a sectional view of the dispensing device taken on line 4—4 of Fig. 3.

Fig. 5 is a perspective view of the conduit mounting assembly as viewed from the bottom.

Fig. 6 is a perspective view of the lower portion of the dispensing device with the front shell of the compartment removed so as to show the mounting of the conduit mounting assembly therein.

Fig. 10 is an enlarged vertical sectional view of the conduit mounting assembly taken on line 10—10 of Fig. 5.

Fig. 11 is a sectional view taken on line 11—11 of Fig. 9 with the front shell of the refrigerated compartment removed.

Figure 1:
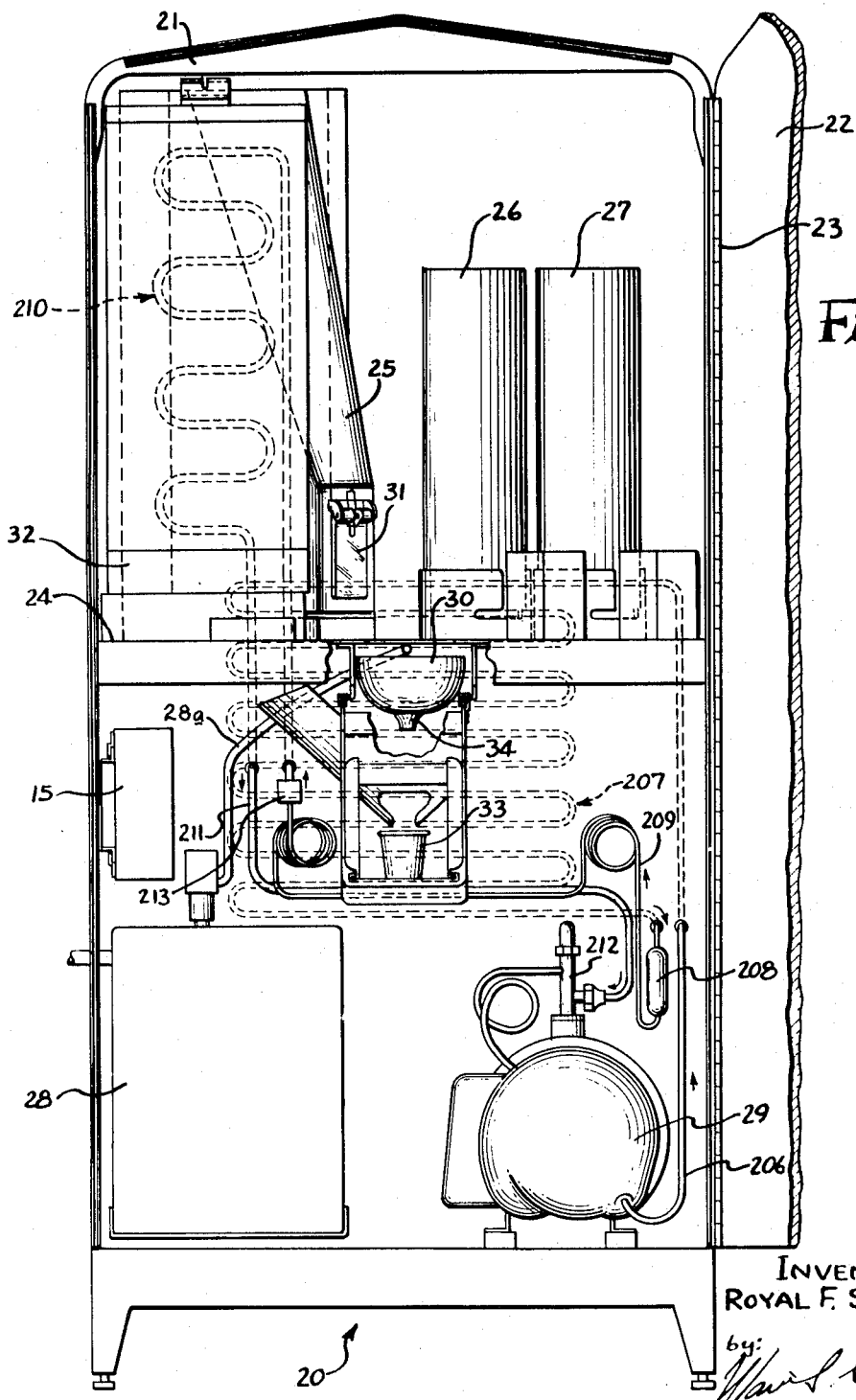
Fig. 1 is a front elevational view of an automatic vending machine embodying the present invention, with the front door of the vending machine swung open and broken away, and part of the center portion of the machine broken away.

Referring to Fig. 1, the reference numeral 20 indicates generally a hot drink vending machine comprising a cabinet 21 having a door 22 attached thereto by hinges 23. Within cabinet 21 and mounted approximately halfway up from the bottom thereof is a shelf 24. Shelf 24 supports a cup magazine 32, a liquid cream dispenser 25 and dry ingredient containers 26, 27 for storing coffee and sugar, respectively. In the lower portion of cabinet 21 is a hot-water container 28 and a compressor 29 constituting part of a refrigeration apparatus for cream dispenser 25.

When the vending machine is actuated to dispense a beverage, the following cycle of operation occurs. Hot water from the container 28 is dispensed through pipe 28a into a mixing bowl or receptacle 30 located just below shelf 24 in the front center of vending machine 20. Also dispensed into receptacle 30 are powdered coffee and sugar, if so selected, from containers 26, 27. If the customer has selected cream, a door 31 on the front of the cream dispenser 25 automatically opens and the discharge end or spout of a cream dispensing conduit is projected outwardly from the refrigerated interior of cream dispenser 25 to a position in which cream can be discharged into receptacle 30. A predetermined amount of cream is dispensed into receptacle 30, after which the conduit is drawn back into the refrigerated interior of cream dispenser 25 and door 31 is automatically closed. While this is taking place, a cup has been dispensed from cup magazine 32 to a position 33 in which it receives the mixed beverage as it flows out of a discharge spout 34 at the bottom of mixing receptacle 30. For a more detailed description of the cycle of operation of the vending machine, except for liquid cream dispenser 25 and its associated refrigeration apparatus, reference is made to Patent No. 2,802,599 issued August 13, 1957.

As shown in Fig. 3, cream dispenser 25 constitutes an enclosed refrigerated compartment and comprises a base 35 to the rear half of which is attached a vertically rising shell portion 36 covered by a top portion 45. A detachable shell portion 37 covered by a top portion 56 rests on the front part of base 35 and is attached to shell portion 36 by fasteners 38.

As seen in Fig. 4, shell portion 36 has a semi-circular rear portion 36a and straight portions 36b integral therewith. Shell portion 36 comprises an exterior wall 41 and an interior wall 40 constituting the curved plate portion of a refrigerator evaporator to be subsequently described. Walls 40, 41 are separated by a soft fibre glass insulated portion 42 and have their ends fastened to vertical cap strips 43, 44 so as to substantially thermally seal insulated portion 42 therebetween.

Detachable shell 37 has an inner wall 45 and an outer wall 46 separated by an insulated space 19. Inner wall 45 is bent outwardly at each rearward end to form flanges 47, 48 to which are attached vertical longitudinal sealing strips 49. Countourwise, detachable shell 37 has a front portion 50 from which diverging side portions 51, 52 extend rearwardly. Integral with side portion 52 and extending rearwardly therefrom is a side portion 53.

Referring again to Fig. 3 it is seen that the front portion of detachable shell 37 has a vertical lower part 54 and an angularly inclined upper part 55. Lower part 54 has an opening 18 (shown in Fig. 4) normally covered by a door 31. Door 31 is pivotally mounted at its upper edge to the outer surface of lower front part 54 by hinge means 57. Door 31 is normally maintained in a closed position by spring 58.

Figure 8:
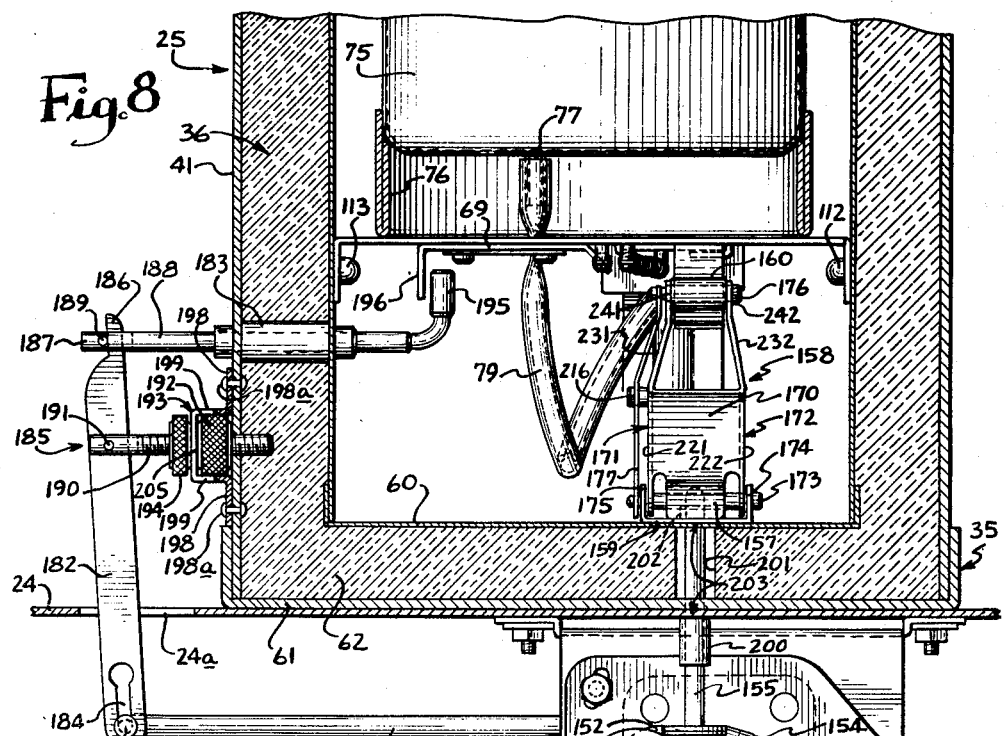
Fig. 8 is a rear elevational view of the lower portion of the dispensing device with the walls broken away and shown in section.

Referring to Fig. 8, base 35 has an upper wall 60 and a lower wall 61 separated therefrom by an insulated space 62. A sealing strip 59 (shown in Figs. 3 and 6) is secured to base 35. When detachable shell portion 37 is placed on base 35 in the manner shown in Fig. 3, it engages sealing strip 59 which together with sealing strips 49 makes substantially air-tight the refrigerated compartment constituted by dispensing device 25.

Compartment 25 is refrigerated in the following manner. Referring to Fig. 1, vaporous refrigerating fluid is compressed in compressor 29 and forced through tube 206 into a condenser generally indicated at 207 where it is cooled, then through a dryer 208, then through another tube 209 and a throtle valve 213 into an evaporator 210 in the form of a zig-zag tube longitudinally mounted to the curved plate portion constituting the interior wall 40 of shell 36 (Fig. 4) and bent to follow the contour thereof. As the refrigerant passes through evaporator 210, heat is absorbed from the interior of compartment 25 thereby cooling compartment 25. The refrigerant then moves through a return tube 211 and a suction valve 212 back into compressor 29 to complete the cycle.

Figure 7:
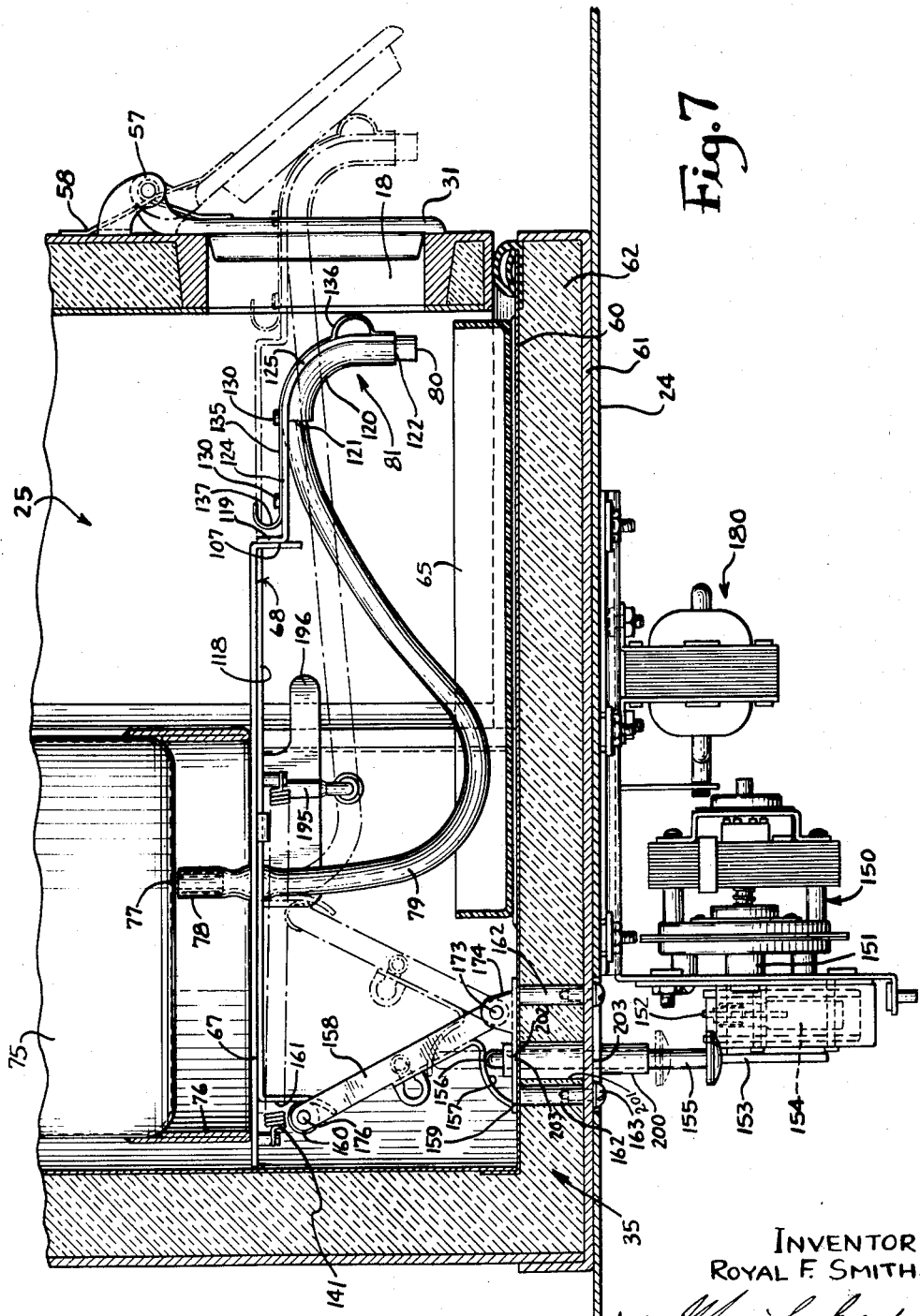
Fig. 7 is a side elevational view of the lower portion of the dispensing device with the walls broken away and shown in section.

Referring now to Fig. 6, resting on upper wall 60 of base 35 is a drip pan 65. Horizontally mounted above drip pan 65 is a conduit mounting assembly 66 comprising a plate 67 (Figs. 5, 7, 10 and 12). As illustrated in Fig. 7, within cream dispensing device 25 is a cylindrical liquid container 75 having a base 76 supported on plate 67. Container 75 has a bottom discharge spout 77 to which is attached one end 78 of a flexible conduit or hose 79. Flexible conduit 79 passes downwardly through a slot 98 (Figs. 4 and 10) in plate 67 and is mounted near its discharge end 80 (Figs. 5 and 7) to the forward portion 81 of a conduit carrying member 68. Member 68 is slidably mounted on the bottom surface of plate 67.

Figure 12:
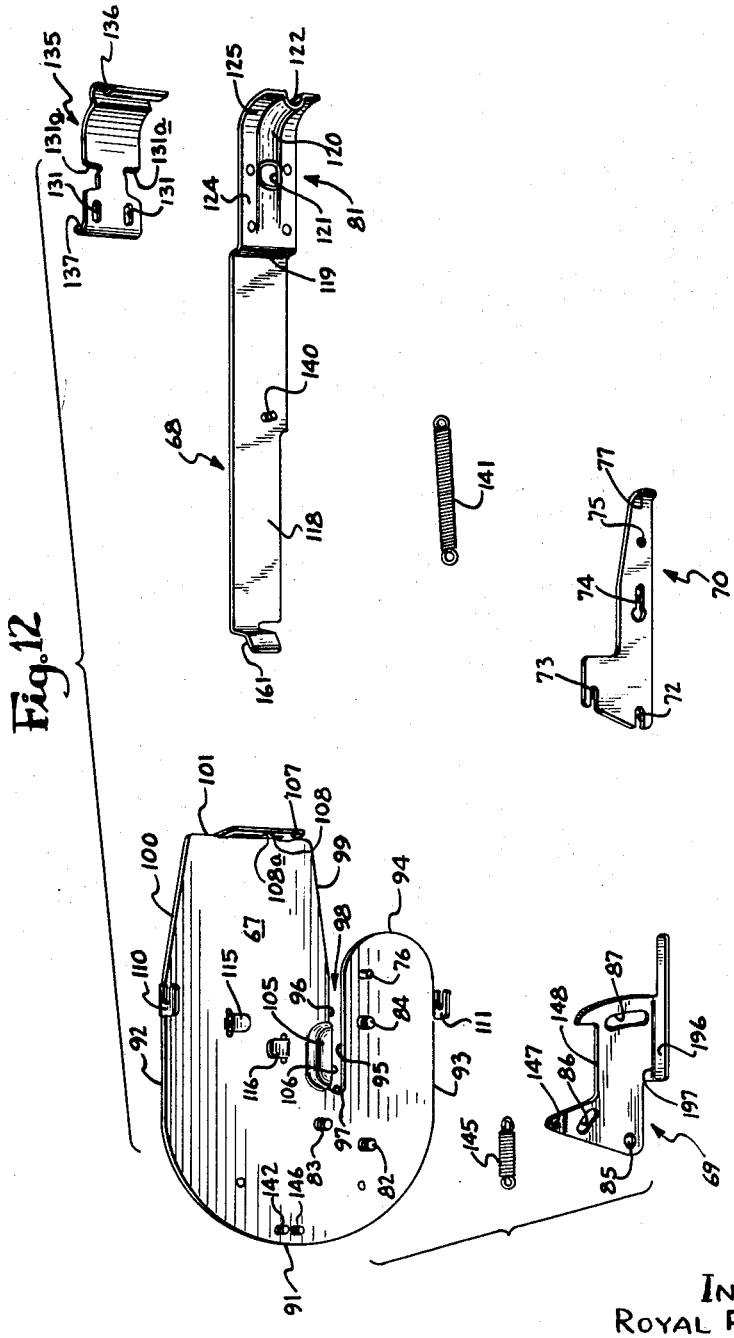
Fig. 12 is an exploded perspective view of the conduit mounting assembly as viewed from the bottom.

Referring to Figs. 4, 5 and 12, mounting plate 67 comprises a semi-circular back edge 91 and two straight edges 92, 93. Extending from straight edge 93 is a convex front edge 94 leading to a rearwardly extending straight edge 95. Parallel to and spaced from edge 95 is an edge 96 connected thereto by a short concave edge 97 so as to form therebetween a slot 98 through which flexible tube 79 extends.

Along edge 96 of slot 98 is a downwardly recessed portion 105 having an edge 106 for purposes to be described. Extending forwardly from edge 96 is an edge 99 leading to a front edge 101 which in turn leads to a lateral edge 100. Extending vertically downwardly from edges 92, 93 are slotted brackets 110, 111 (Figs. 5 and 12) engaging pins 112, 113 (Fig. 4) which extend inwardly from opposite side portions of inner wall 40 of shell 36 so as to support the plate 67 in refrigerated compartment 25. Pins 114, extending inwardly from the rear portion of wall 40, serve as additional support for plate 67.

As shown in Figs. 5 and 12, depending from the bottom surface of plate 67 near the center are depressed horizontal tongues 115, 116 which mount member 68 for slidable movement along the bottom of plate 67. As shown in Figs. 6 and 12, extending vertically downward from edge 101 of plate 67 is a rectangular flange 107 having a lateral slot 108 (Fig. 12) through which member 68 may slide. Slot 108 has a notch 108a to permit passage of pin 140 of member 68 during assembly of conduit mounting assembly 66. When plate 67 is mounted in compartment 25 in the manner shown in Fig. 6, member 68 is in a position to slide in and out of compartment 25 through opening 18 (Fig. 4).

As shown in Figs. 7 and 12, member 68 comprises a horizontal portion 118 from the front of which extends a downward vertical portion 119. Integral with vertical portion 119 is front portion 81 which comprises a horizontal part 124 and a downward curving part 125 integral therewith. As shown in Fig. 5, the part 125 comprises a recessed portion 120 for holding conduit 79. In the rear of portion 120 is an opening 121 for inserting the conduit, and at the front of portion 120 is an opening 122 through which the discharge end 80 of conduit 79 may protrude.

Extending upwardly from horizontal part 124 of member 68 are four grooved pins 130 (Fig. 4) which engage corresponding slots 131 and indented edge portions 131a (Fig. 12) in a superimposed spring conduit retainer 135 thereby securing retainer 135 to part 124. Spring retainer 135 generally follows the arcuate contour of front portion 81 of member 68 (Fig. 7) so as to cover that part of conduit 79 lying in recessed portion 120. At the forward end of retainer 135 is a raised portion 136 which engages and forces open the door 31 as member 68 slides outwardly through opening 18. The extreme rear portion of retainer 135 is curved upwardly to form a handle 137 to be grasped when assembling or disassembling retainer 135 with respect to part 124.

Referring to Figs. 5 and 12, extending downwardly from member 68 is a pin 140 to which is attached one end of a spring 141 having its other end attached to a pin 142 extending downwardly from the rear of plate 67. Spring 141 normally biases member 68 to the retracted position shown by the solid lines in Fig. 7. This position is determined when the inner surface of vertical portion 119 of member 68 contacts the outer surface of vertical flange 107 of plate 67.

Referring to Figs. 5, 10 and 12, extending downwardly from plate 67 are grooved pins 82, 83, 84. Pin 82 is received by a hole 85 in a planar shut-off element 69 and pins 83, 84 are received by slots 86, 87 respectively in element 69. As a result, element 69 may be pivoted on the bottom of plate 67 about pin 82 through an arc the limits of which are defined by the abutment of pins 83, 84 with the edges of slots 86, 87 respectively. Inclined downwardly from the left rear corner of element 69 is a flange 147. Attached to flange 147 is one end of a spring 145, the other end of which is attached to a pin 146 extending downwardly from the rear of plate 67. Spring 145 biases element 69 so that an edge 148 thereof is urged toward edge 106 of slot 98 so as to pinch flexible hose 79 passing therethrough (Figs. 5 and 10). Extending downwardly from an edge 197 opposite and parallel to edge 148 of element 69 is a flange 196 the function of which will be subsequently described.

Mounted immediately below element 69 is a planar spring retainer 70 which holds element 69 in its mounting on the bottom of plate 67. Retainer 70 has slots 72, 73, 74 for engaging grooved pins 82, 83, 84 respectively, and a hole 75 for engaging a stud 76 extending downwardly from plate 67. A handle 77 extends downwardly from the front end of retainer 70 (to the right in Figs. 5 and 12) for grasping when assembling or disassembling retainer 70 with respect to plate 67.

As shown in Fig. 7, the mechanism which drives member 68 together with conduit discharge end 80 outwardly of refrigerated compartment 25 comprises a motor 150 conventionally mounted to the bottom of cabinet shelf 24 and having a drive shaft 151. Fixedly secured to drive shaft 151 are a pair of cams 152, 153 (Figs. 8 and 11). Motor 150 is initially energized by a circuit in the control box 15 (Fig. 1) whereupon cams 152, 153 commence rotation. As a result, a cam follower 225, normally resting within a recess 227 in cam 152 is moved out along the circular periphery 226 of cam 152 and depresses a miniature snap action switch 154. When switch 154 is depressed a circuit is completed which serves as a supplementary energizing circuit for driving motor 150. This supplementary energizing circuit is necessary because the initial energizing circuit which originally started motor 150 has, by this time, been automatically opened. The supplementary energizing circuit remains closed until cam 152 has rotated through substantially an entire cycle whereupon follower 225 then falls into the recess 227 of cam 152. As a result, switch 154 is no longer depressed and the supplementary energizing circuit is opened, thus stopping motor 150.

In Figs. 7 and 8, cam 153 engages a pin 155 slidably mounted for vertical reciprocal movement through vertically aligned openings 203 in cabinet shelf 24, base 35 and a base plate 159 in that order upward and passing through superimposed vertically mounted bearing sleeves 200, 201, 202 in that order upward. Pin 155 is driven upwardly through base 35 of refrigerated compartment 25 from a position shown by the solid lines in Fig 7 to the position shown by the dash-dot lines. During this upward movement the upper end 156 of pin 155 continually engages a cam element 157 attached to a drive arm 158. The lower end of drive arm 158 is pivotally mounted on base 159 mounted on posts 162 extending through compartment base 35 and fastened thereto by screws 163.

Drive arm 158 is pivoted in a clockwise direction (as viewed in Fig. 7) by the upward movement of pin 155. As arm 158 pivots, a roller 160 rotatably mounted at the top of drive arm 158 pushes against a curved flange 161 extending downwardly at the rear of conduit mounting member 68. As a result, member 68 is forced in a forward outward direction (to the right in Fig. 7) against the tension of spring 141. As member 68 moves outwardly, raised portion 136 of conduit retainer 135 engages the inner surface of door 31 to push the latter upwardly about hinges 57.

Member 68 moves outwardly to the extended position shown by the dash-dot lines in Fig. 7 where it remains until cam 153 has rotated to a position allowing pin 155 to move downwardly. As pin 155 descends, spring 141, normally biasing member 68 to the inward position, retracts member 68. As member 68 is retracted, flange 161 pushes inwardly against roller 160 of arm 158 pivoting the latter in a counterclockwise direction back to its normal position shown by the solid lines in Fig. 7. At the same time spring 58 biases door 31 to its normal closed position. By the time member 68 is fully retracted cam 152 has rotated to a position causing cam follower 225 to fall back into recess 227 where it no longer depresses switch 154, thus stopping motor 150.

As seen in Fig. 8, drive arm 158 comprises a substantially rectangular back portion 170 having cam element 157 (Fig. 8) extending therefrom and side portions 171, 172 integral therewith. Side portions 171, 172 each have respective lower portions 221, 222 extending vertically upward and integral with converging middle portions 231, 232 in turn integral with upper vertical portions 241, 242. Extending through lower portions 221, 222 is a pivot pin 173 which is rotatably mounted between flanges 174, 175 projecting upwardly from opposite sides of mounting plate 159. Extending through upper portions 241, 242 is a pin 176 rotatably mounting roller 160.

A strip-like spring retainer 177 bent to substantially the same contour as side portion 171 has slots (not shown) at opposite ends for engaging grooved ends (not shown) of pins 173, 176. Another slot (not shown) in spring retainer 177 engages a grooved pin 216 projecting from side portion 171. When thus mounted pins 173, 176 are held against lateral movement by retainer 177 which in turn is removably secured to side portion 171 by pin 216.

Figure 9:
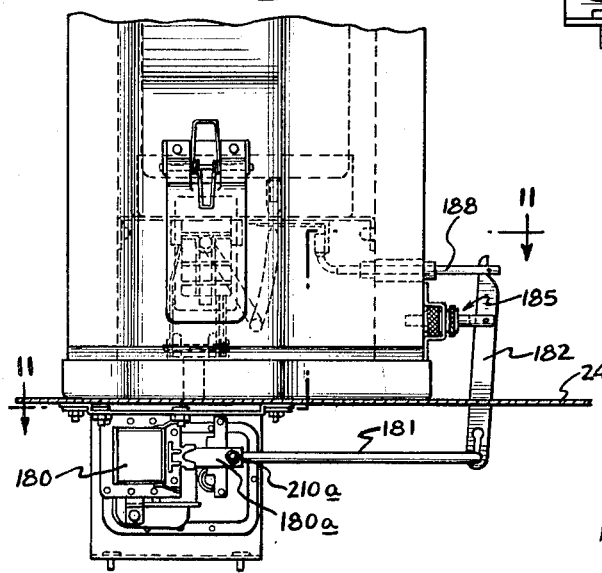
Fig. 9 is a front view of the lower portion of the dispensing device.

While the conduit discharge end 80 of flexible hose 79 is in its extended position, the pinching action of edge 148 of element 69 and edge 106 of slot 98 on hose 79 (Figs. 5 and 10) is relieved for a predetermined period of time. As a result of predetermined amount of liquid flows out of discharge end 80 into mixing receptacle 30. The apparatus which relieves the pinching action of the flow control device comprises a solenoid 180 conventionally attached to the bottom of shelf 24 (Fig. 9). Solenoid 180 is energized at the proper time by a rotating cam in the cotnrol box 15 (Fig. 1) depressing a miniature switch to complete a solenoid energizing circuit. These elements within control box 15 are conventional and are not shown in the drawings.

Upon being energized, solenoid 180 pulls a horizontal rod 181 inwardly (Figs. 8 and 11). Rod 181 has a portion 210 pivotally connected at 210a to the armature 180a of solenoid 180, an angularly extending intermediate portion 211, and an offset portion 212 having a grooved transverse end portion 179. Referring to Fig. 8, end portion 179 engages within a slot 184 in one end of a lever arm 182 extending vertically upwardly therefrom through an opening 24a in cabinet shelf 24 and pivoted on a pin 191. Lever arm 182 terminates in a narrow projection 186 protruding through the bifurcated end 187 of a horizontal trip shaft 188. A pin 189 passing horizontally through bifurcated end 187 retains projection 186 therein. Trip shaft 188 is slidably mounted in a bearing sleeve 183 extending through compartment shell 36, and projects into the interior of refrigerated compartment 25 where it terminates in an upwardly extending arm 195 located to engage flange 196 of element 69 upon outward movement of trip shaft 188.

When solenoid 180 is actuated and rod 181 is pulled inwardly (to the right as viewed in Fig. 8) arm 182 pivots counterclockwise to move trip shaft 188 outwardly, thereby causing arm 195 to engage and pull outwardly against flange 196 of element 69 to pivot the latter against the tension of spring 145 (Fig. 5). As a result the pinching pressure on hose 79 caused by edge 148 of element 69 and edge 106 of slot 98 (Figs. 5 and 10) is relieved thus enabling liquid to flow through conduit 79.

Liquid is allowed to flow through conduit 79 for so long as solenoid 180 is energized. When solenoid 180 is no longer energized, the pressure of arm 195 against flange 196 ceases. Spring 145 is then able to return element 69 to its normal pinching position thereby shutting off the flow of liquid.

In Fig. 8, the reference numeral 185 generally indicates an adjustable fulcrum assembly for adjusting the rate of flow through conduit 79. Assembly 185 comprises a horizontal threaded member 190 extending outwardly from compartment 25. Member 190 is bifurcated at its outer end to receive vertical arm 182. Pivot pin 191 passes horizontally through member 190 and lever arm 182, thereby mounting lever arm 182 for pivotal movement.

An adjustment nut 192 is screwed onto member 190, A retainer 193 has a web portion 205 with a center opening for receiving member 190 and two opposite side portions 199 integral with portions 205. Two flanges 198 extend perpendicularly from opposite side portions 199 and are fastened to outer wall 41 by rivets 198a. A lock nut 194 is screwed onto member 190 behind retainer 193. When nuts 192, 194 are tightened in clamping engagement against opposite surfaces of web portion 205, member 190 is held in position against longitudinal movement in either an inward or outward direction. The position of member 190 may be varied to adjust the rate of flow through conduit 79. More specifically when nut 194 is loosened, member 190 may be moved in an inward direction by turning nut 192 as though to advance it outwardly along member 190. Member 190 may be moved in an outward direction by turning nut 192 as though to advance it inwardly along member 190. When member 190 is in the desired position it may be held thereby tightening nut 194. In response to movement of member 190 arm 182 will be pivoted about the axis of grooved portion 179, thereby sliding trip shaft 188 inwardly or outwardly in corresponding relation to the movement of member 190. The extent to which shaft 188 is thus moved determines the position arm 195 will assume while solenoid 180 is not energized. Consequently, the extent to which member 190 projects outwardly (to the left as viewed in Fig. 8) from compartment 25 determines the aforementioned position of arm 195. Until actuation of solenoid 180, arm 195 is in its initial normal position spaced inwardly from flange 196 by a predetermined clearance distance which may be adjustably varied by adjusting the position of member 190. When member 190 is in its most outward position, arm 195 is relatively close to flange 196. When number 190 is in a less outward position, arm 195 is positioned further inwardly with a greater clearance between it and flange 196. However, no matter what initial position arm 195 may be in, it will travel outwardly substantially the same distance upon actuation of solenoid 180.

As previously mentioned, shut-off element 69 pivots in response to outward movement of flange 196. The extent of this outward movement determines the extent of angular displacement of element 69 which in turn determines the separation between pinching edges 148, 106 which regulates the rate of fluid flow through conduit 79.

Flange 196 will undergo maximum outward movement when arm 195 is adjusted to that initial position which is closest to flange 196, and there will be a maximum rate of flow through conduit 79 upon energization of solenoid 180. When arm 195 is adjusted to an initial position having a greater clearance distance from flange 196, it will move flange 196 through a correspondingly smaller displacement upon energization of solenoid 180.

It is to be understood that the specific embodiment of the invention shown in the drawings and described above is merely illustrative of one of the many forms which the invention may take in practice and is not to be construed as limiting the scope of the invention as defined in the appended claims which are to be interpreted as broadly as possible.

I claim:

1. A vending machine comprising means for dispensing a first ingredient, a container for a liquid second ingredient, a spout in communication with said container, a refrigerated enclosure substantially enclosing said spout, said enclosure having an opening, means mounting said spout for movement through said opening from a retracted position within said refrigerated enclosure to an operative position outwardly of said enclosure and then back toward said retracted position, means for automatically imparting said movement to said spout in timed relation to the dispensing of said first ingredient, and means for automatically dispensing said liquid ingredient through said spout in timed relation to the arrival of said spout at said operative position.

2. A vending machine comprising means for dispensing a first ingredient, a refrigerated enclosure, said enclosure having an opening, a container for a liquid second ingredient and located within said refrigerated enclosure, a spout in communication with said container, means mounting said spout for movement through said opening from a retracted position within said refrigerated enclosure to a dispensing position outwardly of said refrigerated enclosure and then back toward said retracted position, means for automatically moving said spout to said outward position in timed relation to the dispensing of said first ingredient, means for automatically dispensing said liquid ingredient through said spout for a predetermined period of time in timed relation to the arrival of said spout at said dispensing position, and means for returning said spout to said retracted position after dispensation of said liquid ingredient from said spout.

3. A vending machine comprising a mixing receptacle, means for dispensing a first fluid into said mixing receptacle, a refrigerated enclosure, said enclosure having an opening, closure means mounted for movement between a closed position covering said opening and an open position so as to uncover said opening, said closure means normally being in said closed position, a container for a second fluid and located within said refrigerated enclosure, a conduit having an inlet end in communication with said container and a discharge end, means mounting said conduit discharge end for movement through said opening from a retracted position within said refrigerated enclosure to a dispensing position outwardly of said refrigerated enclosure and then back toward said retracted position, said discharge end being located so as to dispense said second fluid into said receptacle when said discharge end is outwardly of said refrigerated enclosure, means for moving said closure means to said open position in response to the outward movement of said discharge end, means for moving said discharge end to said outward position in timed relation to the dispensing of said first fluid into said mixing receptacle, means for automatically dispensing said second fluid through said conduit for a predetermined period of time in timed relation to the arrival of said discharge end at said dispensing position, means for returning said discharge end to said retracted position after dispensation of said second fluid from said discharge end, whereby any fluid residue remaining in said conduit is maintained refrigerated so as to prevent bacterial growth in said residue.

4. A vending machine comprising means for dispensing a first fluid ingredient, means for dispensing another ingredient in timed relation to the dispensing of said first fluid ingredient, a mixing receptacle positioned to receive said first fluid ingredient and said other ingredient, a refrigerated enclosure, said enclosure having an opening, a door normally closing said opening, a container for a second fluid ingredient, said container being within said refrigerated enclosure, a conduit having an inlet end in communication with said container and a discharge end, flow control means normally actuated to shut off the flow of said second fluid ingredient from said container through said conduit, means mounting said conduit discharge end for movement through said opening from a retracted position within said refrigerated enclosure to a dispensing position outwardly of said refrigerated enclosure and then back toward said retracted position, said discharge end being located so as to dispense said second fluid ingredient into said mixing receptacle when said discharge end is in said dispensing position, means for automatically opening said door in response to the outward movement of said discharge end, means for automatically moving said discharge end to said outward position in timed relation to the supply of said first fluid ingredient and said other ingredient to said mixing receptacle, deactuating means for automatically deactuating said flow control means for a predetermined period of time while said discharge end is in said dispensing position, means for returning said discharge end to said retracted position after dispensation of said second fluid ingredient from said discharge end, and means for closing said door in response to the return movement of said discharge end to said retracted position, whereby any fluid residue remaining in said conduit is maintained refrigerated so as to prevent bacterial growth in said residue.

5. A vending machine as recited in claim 4 wherein said conduit comprises a flexible tube, said flow control means comprising pinching means normally actuated to pinch said flexible tube so as to close said tube to the flow of fluid therethrough.

6. A vending machine as recited in claim 5 wherein said deactuating means comprises solenoid means for deactuating said pinching means upon energization of said solenoid means, said vending machine comprising means for energizing said solenoid means in timed relation to said outward movement of said discharge end.

7. A vending machine as recited in claim 5 wherein said pinching means comprises two members, said flexible tube passing between said members, said members normally being urged toward each other so as to pinch said flexible tube therebetween, said deactuating means comprising means for separating said members so as to open said tube to the flow of fluid, said vending machine comprising means for varying the gap between said members when said members have been separated so as to vary the size of the opening in said flexible tube.

8. A vending machine comprising means for dispensing a first ingredient, a container for a liquid second ingredient, a flexible tube having an inlet end in communication with said container and a discharge end, a refrigerated enclosure substantially enclosing said discharge end, said enclosure having an opening, means mounting said discharge end for movement through said opening from a retracted position within said refrigerated enclosure to a position outwardly of said refrigerated enclosure and then back toward said retracted position, means for automatically imparting said movement to said discharge end in timed relation to the dispensing of said first ingredient, and means for automatically dispensing said liquid ingredient through said discharge end in timed relation to the arrival of said discharge end outwardly of said refrigerated enclosure.

9. A vending machine as recited in claim 8 comprising pinching means normally actuated to pinch said flexible tube so as to close said tube to the flow of liquid ingredient therethrough, said dispensing means comprising means for deactuating said pinching means while said discharge end is outwardly of said refrigerated compartment.

10. A vending machine comprising a mixing receptacle, means for dispensing a first ingredient into said mixing receptacle, a refrigerated enclosure, said enclosure having an opening, closure means mounted for movement between a closed position covering said opening and an open position so as to uncover said opening, said closure means normally being in said closed position, a liquid ingredient container within said refrigerated enclosure, said container having a discharge spout located within said refrigerated enclosure, means for automatically moving said closure means to said open position in timed relation to the dispensing of said first ingredient, and means for automatically dispensing liquid ingredient from said container through said spout and said uncovered opening and into said mixing receptacle in timed relation to the dispensing of said first ingredient.

11. A vending machine comprising means for dispensing a first fluid ingredient, means for dispensing another ingredient in timed relation to the dispensing of said first fluid ingredient, a mixing receptacle positioned to receive said first fluid ingredient and said other ingredient, a container for a second fluid ingredient, a flexible tube having an inlet end in communication with said container and a discharge end, pinching means normally actuated to pinch said tube so as to close said tube to the flow of said second fluid ingredient therethrough, a refrigerated enclosure substantially enclosing said discharge end, said enclosure having an opening, a door normally closing said opening, means mounting said discharge end for movement through said opening from a retracted position within said refrigerated enclosure to a dispensing position outwardly of said refrigerated enclosure and then back toward said retracted position, said discharge end being located so as to dispense said second fluid ingredient into said mixing receptacle when said discharge end is in said dispensing position, means for automatically opening said door in response to the outward movement of said discharge end, means for automatically moving said discharge end to said outward position in timed relation to the supply of said first fluid ingredient and said other ingredient to said mixing receptacle, deactuating means for automatically deactuating said pinching means for a predetermined period of time while said discharge end is in said dispensing position, means for returning said discharge end to said retracted position after dispensation of said second fluid ingredient from said discharge end, and means for closing said door in response to the return movement of said discharge end to said retracted position.

12. A device for dispensing liquid ingredients comprising a refrigerated enclosure, said enclosure having an opening, closure means mounted for movement between a closed position covering said opening and an open position so as to uncover said opening, said closure means normally being in said closed position, a liquid ingredient container within said refrigerated enclosure, a flexible conduit having an inlet end in communication with said container and a discharge end, means mounting said conduit discharge end for sliding reciprocal movement through said opening from a retracted position within said refrigerated enclosure to a dispensing position outwardly of said enclosure and then back toward said retracted position, means for moving said closure means to said open position in response to the outward movement of said discharge end, means for imparting said movement to said discharge end, means for automatically dispensing said liquid ingredient through said conduit for a predetermined period of time in timed relation to the arrival of said discharge end at said dispensing position, and means for returning the closure means to its normal closed position in response to said movement of the discharge end back to its retracted position.

13. A device for dispensing liquid ingredients comprising a refrigerated enclosure, said enclosure having an opening, a door normally closing said opening, a liquid ingredient container within said refrigerated enclosure, a conduit having an inlet end in communication with said container and a discharge end, flow control means normally actuated to shut off the flow of liquid ingredient from said container through said conduit, means mounting said conduit discharge end for movement through said opening from a retracted position within said refrigerated enclosure to a position outwardly of said refrigerated enclosure and then back toward said retracted position, means for automatically opening said door in timed relation to the outward movement of said discharge end, means for automatically moving said discharge end to said outward position and for then returning said discharge end to said retracted position, means for automatically deactuating said flow control means for a predetermined period of time while said discharge end is outwardly of said refrigerated enclosure, and means for automatically closing said door in timed relation to said movement of said discharge end back toward said retracted position.

14. A device as recited in claim 13 wherein said conduit comprises a flexible tube, said flow control means comprising pinching means normally actuated to pinch said flexible tube so as to close said tube to the flow of liquid ingredient therethrough.

15. A device as recited in claim 14 wherein said deactuating means comprises solenoid means for deactuating said pinching means upon energization of said solenoid means, said device comprising means for energizing said solenoid means in timed relation to said outward movement of said discharge end.

16. A device as recited in claim 14 wherein said pinching means comprises two members, said flexible tube passing between said members, said members normally being urged toward each other so as to pinch said flexible tube therebetween, said actuating means comprising means for separating said members so as to open said tube to the flow of liquid, said device comprising means for varying the gap between said members when said members have been separated so as to vary the size of the opening in said flexible tube.

17. A device for dispensing liquid ingredients comprising a liquid ingredient container, a flexible tube having an inlet end in communication with said container and a discharge end, a refrigerated enclosure substantially enclosing said discharge end, said refrigerated enclosure having an opening, a door normally closing said opening, means mounting said discharge end for sliding reciprocal movement through said opening from a retracted position within said refrigerated enclosure to a dispensing position outwardly of said refrigerated enclosure and then back toward said retracted position, means for automatically opening said door in timed relation to the outward movement of said discharge end, means for automatically moving said discharge end to said outward position and for then returning said discharge end to said retracted position, means for automatically dispensing said liquid ingredient through said discharge end for a predetermined period of time in timed relation to the arrival of said discharge end outwardly of said refrigerated enclosure, and means for automatically closing said door in timed relation to said movement of said discharge end back toward said retracted position.

References Cited in the file of this patent

UNITED STATES PATENTS

| | | |
|---|---|---|
| 2,126,491 | McCartha | Aug. 9, 1938 |
| 2,377,261 | Norris | May 29, 1945 |
| 2,685,393 | Thompson | Aug. 3, 1954 |
| 2,761,607 | Ayars | Sept. 4, 1956 |